(12) United States Patent
Rice (10) Patent No.: US 11,396,386 B2
(45) Date of Patent: Jul. 26, 2022

(54) SUPPORTING OFF-WING MAINTENANCE OF AN ENGINE OF AN AIRCRAFT

(71) Applicant: THE BOEING COMPANY, Chicago, IL (US)

(72) Inventor: Joseph Rice, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 564 days.

(21) Appl. No.: 16/417,065

(22) Filed: May 20, 2019

(65) Prior Publication Data

US 2020/0369410 A1 Nov. 26, 2020

(51) Int. Cl.
*B64F 5/60* (2017.01)
*G06N 20/00* (2019.01)
*B64D 45/00* (2006.01)

(52) U.S. Cl.
CPC .............. *B64F 5/60* (2017.01); *B64D 45/00* (2013.01); *G06N 20/00* (2019.01); *B64D 2045/0085* (2013.01)

(58) Field of Classification Search
CPC ... B64F 5/60; B64D 2045/0085; G06N 20/00; B60W 20/11; B60W 50/0097; G05B 2219/32371
See application file for complete search history.

(56) References Cited

U.S. PATENT DOCUMENTS

| 8,437,904 | B2 * | 5/2013 | Mansouri | G07C 5/0808 244/152 |
|---|---|---|---|---|
| 9,324,193 | B2 * | 4/2016 | Sudolsky | G07C 5/008 |
| 9,747,564 | B1 * | 8/2017 | Shi | G06Q 10/0631 |
| 2018/0137219 | A1 * | 5/2018 | Goldfarb | G06N 3/126 |
| 2018/0260720 | A1 * | 9/2018 | Wu | G06N 20/00 |
| 2018/0307784 | A1 * | 10/2018 | Stevens | F01D 21/14 |
| 2018/0362190 | A1 * | 12/2018 | Chambers | B64D 45/00 |
| 2019/0302710 | A1 * | 10/2019 | Neti | G07C 3/14 |
| 2019/0384257 | A1 * | 12/2019 | Zhang | G05B 19/0428 |
| 2020/0079532 | A1 * | 3/2020 | Rix | G01C 23/00 |

OTHER PUBLICATIONS

Maggiore et al., "Monitoring Real-Time Environmental Performance", Aero Q, 3, pp. 22-25.

* cited by examiner

*Primary Examiner* — Russell Frejd
*Assistant Examiner* — Sara J Lewandroski
(74) *Attorney, Agent, or Firm* — Womble Bond Dickinson (US) LLP (57) ABSTRACT

A method of supporting off-wing maintenance of an engine of a specific aircraft includes accessing flight data for a plurality of aircraft including measurements of properties from sensors or avionic systems, and maintenance data that indicates past maintenance or off-wing maintenance of a corresponding engine of each aircraft. A machine learning model is built to predict a life expectancy of the engine of the specific aircraft, measured to future off-wing maintenance of the engine, using a machine learning algorithm, and a set of features produced from selected properties. The machine learning model is built further using a training set produced from the set of features, the flight data including measurements of the selected properties, and the maintenance data. The machine learning model is then output for deployment to predict and thereby produce a prediction of the life expectancy of the engine of the specific aircraft from distinct flight data.

27 Claims, 4 Drawing Sheets

SUPPORTING OFF-WING MAINTENANCE OF AN ENGINE OF AN AIRCRAFT

TECHNOLOGICAL FIELD

The present disclosure relates generally to vehicle maintenance and, in particular, to supporting off-wing maintenance of an engine of an aircraft.

BACKGROUND

In the aviation industry, aircraft inspections and maintenance are typically scheduled after a period of operation time or flight hours, or when predetermined flight cycles have been reached. The inspection and maintenance processes are comprehensive and ongoing. For example, certain aircraft components are replaced upon reaching a maximum allowable usage, while other parts are periodically checked for field failures or faulty performance.

Due at least in part to escalating costs of engine removal and repair of an engine off its aircraft, engine maintenance can be a contentious piece of aircraft ownership for operators. There are consistent engagements between aircraft manufacturer, operator and engine original equipment manufacturer (OEM) about how long an engine should last. Given all of the variability currently in place, however, it is difficult to gain clarity on how long an interval an engine actually achieves before being removed from the aircraft and inducted into a maintenance, repair and overhaul (MRO) facility for off-wing maintenance.

Therefore it would be desirable to have a system and method that takes into account at least some of the issues discussed above, as well as other possible issues.

BRIEF SUMMARY

Example implementations of the present disclosure are directed to vehicle maintenance and, in particular, to supporting off-wing maintenance of an engine of an aircraft. Example implementations leverage machine learning and data from several sources to predict engine life more accurately than current capabilities. According to example implementations, a machine learning model is built using new data not generally available or even contemplated by the engine maintenance community, but that appears to have value in predicting how long an engine will last before he needs to be pulled off-wing for maintenance.

The present disclosure thus includes, without limitation, the following example implementations.

Some example implementations provide a method of supporting off-wing maintenance of an engine of a specific aircraft of a particular type of aircraft, the method comprising accessing flight data for flights of a plurality of aircraft of the particular type of aircraft, the flight data for each flight of each aircraft of the plurality of aircraft including measurements of properties from sensors or avionic systems of the aircraft during the flight; accessing maintenance data that indicates past maintenance or off-wing maintenance of a corresponding engine of each aircraft of the plurality of aircraft; building a machine learning model to predict a life expectancy of the engine of the specific aircraft, measured to future off-wing maintenance of the engine, the machine learning model built using a machine learning algorithm, and a set of features produced from selected ones of the properties, the machine learning model built further using a training set produced from the set of features, the flight data including measurements of the selected ones of the properties, and the maintenance data; and outputting the machine learning model for deployment to predict and thereby produce a prediction of the life expectancy of the engine of the specific aircraft from distinct flight data for one or more flights of the specific aircraft.

In some example implementations of the method of any preceding example implementation, or any combination of any preceding example implementations, the flight data includes the measurements of the properties recorded by an aircraft condition monitoring system (ACMS) from the sensors or avionic systems during the flight, and wherein least some of the flight data for each flight is accessed from ACMS reports generated by the ACMS.

In some example implementations of the method of any preceding example implementation, or any combination of any preceding example implementations, the flights are between airports, and the method further comprises accessing airport infrastructure attributes of the airports, the airport infrastructure attributes including values of runway characteristics or environmental conditions at the airports, wherein the machine learning model is built using the set of features produced further from selected ones of the airport infrastructure attributes, and the training set produced further from values of the selected ones of the airport infrastructure attributes.

In some example implementations of the method of any preceding example implementation, or any combination of any preceding example implementations, the method further comprises accessing aircraft configuration attributes of the plurality of aircraft of the particular type of aircraft, the aircraft configuration attributes including values of attributes of the corresponding engine of each aircraft of the plurality of aircraft, and wherein the machine learning model is built using the set of features produced further from selected ones of the aircraft configuration attributes, and the training set produced further from values of the selected ones of the aircraft configuration attributes.

In some example implementations of the method of any preceding example implementation, or any combination of any preceding example implementations, the method further comprises performing a feature selection or construction using the properties to produce features of the set of features from the selected ones of the properties.

In some example implementations of the method of any preceding example implementation, or any combination of any preceding example implementations, performing the feature selection or construction includes applying one or more of the selected ones of the properties to a transformation to produce a feature of the set of features.

In some example implementations of the method of any preceding example implementation, or any combination of any preceding example implementations, the flights are between airports, and the method further comprises accessing airport infrastructure attributes of the airports, the airport infrastructure attributes including values of runway characteristics or environmental conditions at the airports, wherein the feature selection or construction is performed further using the airport infrastructure attributes to produce the features of the set of features.

In some example implementations of the method of any preceding example implementation, or any combination of any preceding example implementations, the method further comprises accessing aircraft configuration attributes of the plurality of aircraft of the particular type of aircraft, the aircraft configuration attributes including attributes of the corresponding engine of each aircraft of the plurality of aircraft, and wherein the feature selection or construction is performed further using the aircraft configuration attributes to produce the features of the set of features.

In some example implementations of the method of any preceding example implementation, or any combination of any preceding example implementations, the method further comprises scheduling off-wing maintenance of the engine of the specific aircraft based on the prediction of the life expectancy of the engine.

In some example implementations of the method of any preceding example implementation, or any combination of any preceding example implementations, the method further comprises determining an adjustment to utilization of the engine of the specific aircraft based on the prediction of the life expectancy of the engine.

Some example implementations provide an apparatus for supporting off-wing maintenance of an engine of a specific aircraft of a particular type of aircraft. The apparatus comprises a memory storing flight data for flights of a plurality of aircraft of the particular type of aircraft, the flight data for each flight of each aircraft of the plurality of aircraft including measurements of properties from sensors or avionic systems of the aircraft during the flight, the memory also storing maintenance data that indicates past maintenance or off-wing maintenance of a corresponding engine of each aircraft of the plurality of aircraft; and processing circuitry configured to access the memory, and execute computer-readable program code to cause the apparatus to at least perform the method of any preceding example implementation, or any combination of any preceding example implementations.

Some example implementations provide a computer-readable storage medium for supporting off-wing maintenance of an engine of a specific aircraft of a particular type of aircraft, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to vehicle maintenance and, in particular, to supporting off-wing maintenance of an engine of an aircraft. Example implementations may be particularly useful to predict the life expectancy of the engine. It should be understood that the life expectancy may be measured to future off-wing maintenance of the engine, or otherwise to removal from the aircraft for induction into a MRO facility for off-wing maintenance. It should also be understood that other events may be triggered by an engine removal. Examples of these events include quick engine change (QEC) kit acquisition, scheduling personnel and equipment needed to perform an engine switch, finding an adequate suitable spare engine, planning for engine induction, and the like.

While example implementations will be primarily described in conjunction with off-wing maintenance of an engine, example implementations may also be extended to an auxiliary power unit (APU), which is similar to an engine in architecture. Also, while example implementations will be primarily described in conjunction with aircraft such as airplanes, it should be understood that example implementations may be utilized in conjunction with a variety of other vehicles. Examples of suitable vehicles that may benefit from example implementations include spacecraft, watercraft, motor vehicles, railed vehicles and the like. Furthermore, it should be understood that unless otherwise specified, the terms "data," "content," "digital content," "information," and similar terms may be at times used interchangeably.

Figure 1:
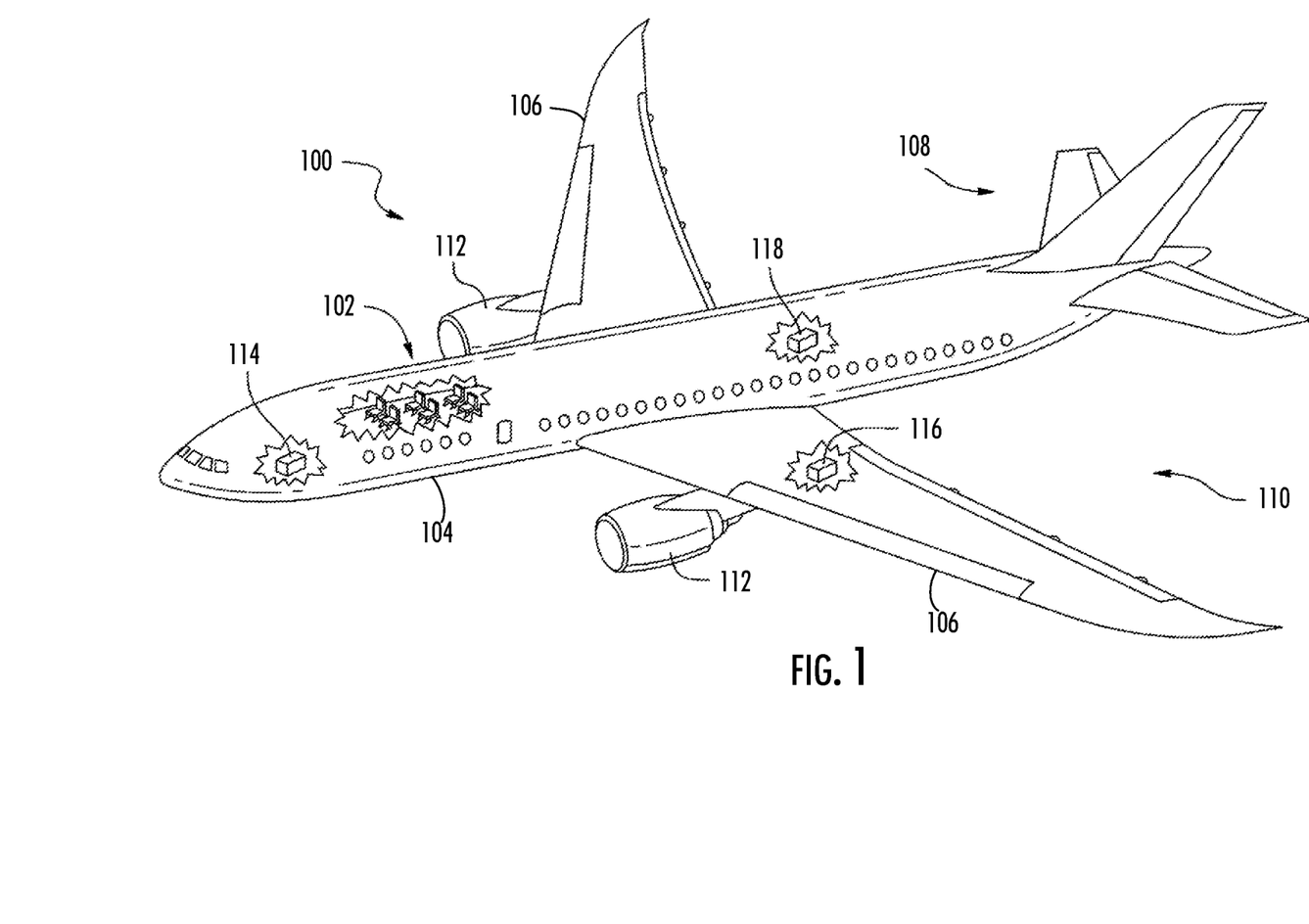
FIG. 1 illustrates an aircraft according to some example implementations of the present disclosure.

FIG. 1 illustrates one type of aircraft 100 that may benefit from example implementations of the present disclosure. As shown, the aircraft includes an airframe 102 with a fuselage 104, wings 106 and tail 108. The aircraft also includes a plurality of high-level systems 110 such as a propulsion system. In the particular example shown in FIG. 1, the propulsion system includes two wing-mounted engines 112. In other embodiments, the propulsion system can include other arrangements, for example, engines carried by other portions of the aircraft including the fuselage and/or the tail. The high-level systems may also include an electrical system 114, hydraulic system 116 and/or environmental system 118. Any number of other systems may be included.

Figure 2:
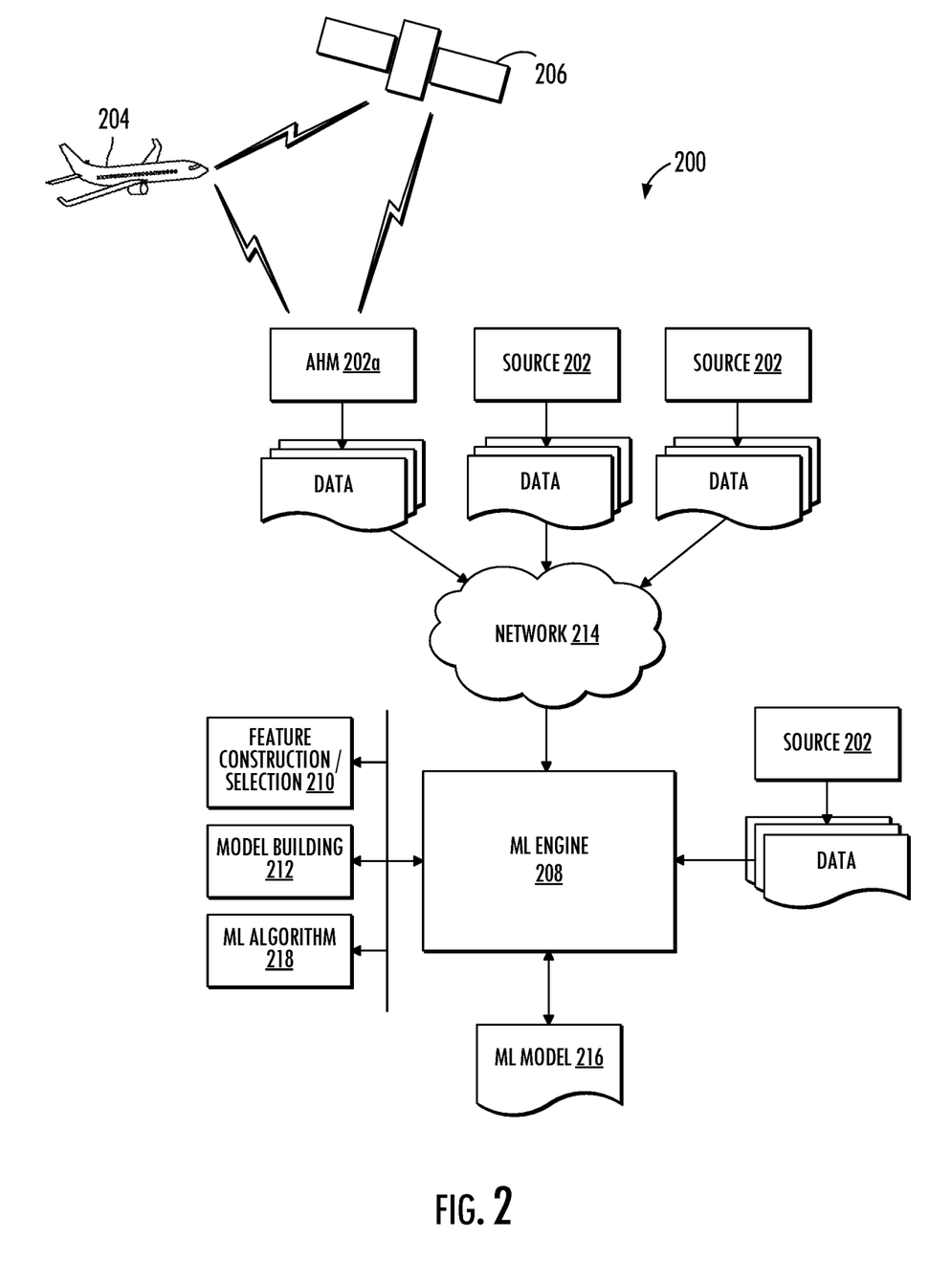
FIG. 2 illustrates a system for supporting off-wing maintenance of an engine of a specific aircraft of a particular type of aircraft, according to some example implementations.

FIG. 2 illustrates a system 200 for supporting off-wing maintenance of an engine of a specific aircraft of a particular type of aircraft, such as aircraft 100, according to some example implementations. The system may include any of a number of different subsystems (each an individual system) for performing one or more functions or operations. As shown, in some examples, the system includes at least one source 202 of data. In some examples, the source includes a memory that may be located at a single source or distributed across multiple sources. The data may be stored in a number of different manners, such as in a database or flat files of any of a number of different types or formats.

In some examples, the data includes flight data for flights of a plurality of aircraft of the particular type of aircraft. The flight data for each flight of each aircraft of the plurality of aircraft including measurements of properties from sensors or avionic systems of the aircraft during the flight. In some more particular examples, the flight data includes the measurements of the properties recorded by an aircraft condition monitoring system (ACMS) from the sensors or avionic systems during the flight, and least some of the flight data for each flight is accessible from ACMS reports generated by the ACMS. The ACMS is a system onboard an aircraft 204 configured to record flight data and produce ACMS reports, which may be wirelessly transmitted to a particular source 202 of data—shown and at times referred to as an airplane health management (AHM) system 202a—directly or via an artificial satellite 206 or network. In yet other examples, the flight data may be transmitted via by a wired connection or portable data storage device (e.g., flash memory, thumb drive).

In even more particular examples, the flight data may include at least some of the following:
  aircraft weight
  aircraft mission lengths (hours/cycle)
  ambient temperature
  cruise altitude
  pitch
  roll
  angle of attack
  city pair
  climb time
  takeoff throttle resolver angle
  climb throttle resolver angle
  cruise throttle resolver angle
  takeoff spool speeds
  climb spool speeds
  cruise spool speeds
  downtime between flights In some examples, the data from the source(s) 202, AHM system 202a also includes maintenance data, airport infrastructure attributes for a plurality of airports, and/or aircraft configuration attributes of the plurality of aircraft of the particular type of aircraft. The maintenance data indicates past maintenance or off-wing maintenance of a corresponding engine of each aircraft of the plurality of aircraft. The airport infrastructure attributes include values of runway characteristics or environmental conditions at the plurality of airports. And the aircraft configuration attributes include values of attributes of the corresponding engine of each aircraft of the plurality of aircraft.

In some particular examples, the maintenance data may include engine removal data and reason, and/or engine maintenance records. The airport infrastructure attributes for the plurality of airports may include at least some of the following:
  runway length
  elevation
  runway material
  runway pavement rating
  weather conditions
  particulate conditions (smog, sand, etc.)
  runway approach category The aircraft configuration attributes may include at least some of the following:
  engine type
  engine thrust rating
  engine configuration
  aircraft type The system 200 of example implementations of the present disclosure use machine learning to analyze at least some of the above data. In this regard, machine learning (ML) is a process to analyze data in which a dataset is used to determine a ML model (also called a rule or a function) that maps input data (also called independent variables, explanatory variables or predictors) to output data (also called dependent variables or response variables) according to a machine learning algorithm. A broad array of machine learning algorithms are available, with new algorithms the subject of active research. One type of machine learning is supervised learning involving a model that is trained with a dataset including known output data for a sufficient number of input data. Once a model is trained, it may be deployed, i.e., applied to new input data to predict the expected output.

Machine learning may be applied to a number of different types of problems such as regression problems in which the output data includes one or more numeric values. In the case of present disclosure, this may include a prediction of the life expectancy of the engine of the specific aircraft, measured to future off-wing maintenance of the engine. In some examples, properties from the sensors or avionic systems of the aircraft, the airport infrastructure attributes and/or the aircraft configuration attributes may be or include independent variables for the ML model, while life expectancy of the engine may be a dependent variable.

Returning to FIG. 2, then, the system 200 includes a machine learning (ML) engine 208 for development and deployment of a ML model to predict the life expectancy of the engine. The ML engine may include or interact with a feature construction or selection module 210, and a model building module 212. Although shown as one engine, in some examples, the ML engine may comprise two engines including a ML model development (first) engine for development of the ML model, and a ML model deployment (second) engine for deployment of the ML model.

The subsystems including the source(s) 202, AHM system 202a, ML engine 208 (or first and second engines), feature construction or selection module 210, and model building module 212 may be co-located or directly coupled to one another, or in some examples, various ones of the subsystems may communicate with one another across one or more computer networks 214. Further, although shown as part of the system 200, it should be understood that any one or more of the above may function or operate as a separate system without regard to any of the other subsystems. It should also be understood that the system may include one or more additional or alternative subsystems than those shown in FIG. 2.

The ML engine 208 is configured to access data from the source(s) 202. As suggested above, in some examples, the flight data includes the measurements of the properties recorded by an ACMS from the sensors or avionic systems during the flight. In some of these examples, ML engine is configured to access at least some of the flight data for each flight from ACMS reports generated by the ACMS, which may be accessed from the AHM system 202a.

The ML engine 208 is configured to cooperate with the feature construction or selection module 210, and/or model building module 212 to develop and deploy a ML model 216 to predict a life expectancy of the engine of the specific aircraft, measured to future off-wing maintenance of the engine. In some examples, then, the ML engine is configured to access the flight data and the maintenance data from the source(s) 202—or their memory. The ML engine may cooperate with the feature construction or selection module 210 to perform a feature selection or construction using the properties to produce features of the set of features from the selected ones of the properties. In some examples, this includes the ML engine 208 configured to apply one or more of the selected ones of the properties to a transformation to produce a feature of the set of features. Examples of suitable transformations include aggregations (e.g. examination of means, standard deviations, skews, and kurtoses), power evaluations (e.g. for property x taking $\sqrt{x}$, $x^2$, $x^3$, $\ln(x)$, etc.), interaction terms (e.g. for properties x, y, z, looking at the products xy, xz, yz, and xyz), any combinations of the foregoing, and the like.

In some examples, the flights are between airports, and the ML engine 208 is configured to further access the airport infrastructure attributes. In some of these examples, the ML engine is configured to perform the feature selection or construction further using the airport infrastructure attributes to produce the features of the set of features. Additionally or alternatively, in some examples, the ML engine 208 is configured to further access the aircraft configuration attributes and the ML engine is configured to perform the feature selection or construction further using the aircraft configuration attributes to produce the features of the set of features.

In some particular examples, the feature selection or construction may include the ML engine applying at least some if not all of the independent variables to a lasso (least absolute shrinkage and selection operator) regression analysis, ridge regression or the like. This may include properties from the sensors or avionic systems of the aircraft, the airport infrastructure attributes and the aircraft configuration attributes. In a lasso regression analysis and similar analyses, values of some of the independent variables may be codified such as with binary switches or intervals. The lasso regression analysis may produce coefficients that indicate the relevance (correlation) of the independent variables to a dependent variable of interest such as life expectancy of the engine. These coefficients may then be used to select at least some of the independent variables for the set of features.

The ML engine 208 is configured to cooperate with the model building module 212 to build the ML model 216 using a machine learning (ML) algorithm 218, and the set of features produced from selected ones of the properties (from the flight data). In addition, the ML model may be built further using a training set produced from the set of features, the flight data including measurements of the selected ones of the properties, and the maintenance data. In some examples, lasso regression analysis may be used for the ML algorithm. In other examples, a random forest algorithm, neural network or other regression algorithm may be used for the ML algorithm. The random forest and similar algorithms may be used without codifying values of any of the independent variables in the set of features.

Similar to above with feature construction or selection, in some examples, the airport infrastructure attributes and/or the aircraft configuration attributes may be used in building the ML model 216. In some examples, then, the ML engine 208 is configured to build the ML model using the set of features produced further from selected ones of the airport infrastructure attributes, and the training set produced further from values of the selected ones of the airport infrastructure attributes. Additionally or alternatively, in some examples, the ML engine is configured to build the ML model using the set of features produced further from selected ones of the aircraft configuration attributes, and the training set produced further from values of the selected ones of the aircraft configuration attributes.

In some examples, the ML engine 208 may add or otherwise employ one or more additional models to the ML model 216 such as deep learning models. Additional models such as deep learning may be able to take into account how the engine is flying over time to enable even more accurate predictions.

The ML engine 208 is further configured to output the ML model 216 for deployment to predict and thereby produce a prediction of the life expectancy of the engine of the specific aircraft from distinct flight data for one or more flights of the specific aircraft. And as suggested above, in some examples, this deployment may also be implemented by the ML engine or a separate ML model deployment (second) engine.

In some examples, deployment of the ML model 216 includes the ML engine 208 configured to schedule off-wing maintenance of the engine of the specific aircraft based on the prediction of the life expectancy of the engine. Additionally or alternatively, in some examples, deployment includes the ML engine configured to determine an adjustment to utilization of the engine of the specific aircraft based on the prediction of the life expectancy of the engine. In some of these examples, the off-wing maintenance of the engine of the specific aircraft may be performed in accordance with the schedule determined based on the prediction. Similarly, utilization of the engine of the specific aircraft may be adjusted according to the adjustment determined based on the prediction. Adjustment of the utilization may include, for example, taking one engine and putting it on a different aircraft to increase the remaining life of the engine and/or limit operational impact of the engine's impending removal requirement.

Figure 3:
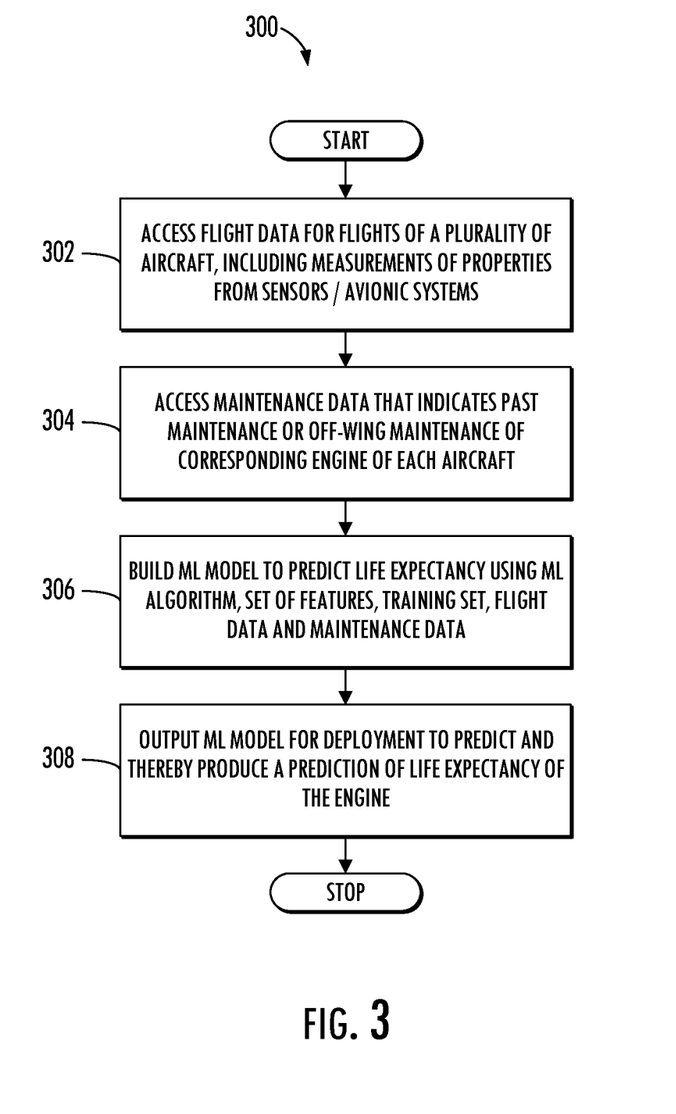
FIG. 3 is a flowchart illustrating various steps in a method of supporting off-wing maintenance of an engine of a specific aircraft of a particular type of aircraft, according to example implementations.

FIG. 3 is a flowchart illustrating various steps in a method 300 of supporting off-wing maintenance of an engine of a specific aircraft of a particular type of aircraft, according to example implementations of the present disclosure. As shown at blocks 302 and 304, the method includes accessing flight data for flights of a plurality of aircraft of the particular type of aircraft, and maintenance data that indicates past maintenance or off-wing maintenance of a corresponding engine of each aircraft of the plurality of aircraft. The flight data for each flight of each aircraft of the plurality of aircraft including measurements of properties from sensors or avionic systems of the aircraft during the flight.

The method includes building a ML model to predict a life expectancy of the engine of the specific aircraft, measured to future off-wing maintenance of the engine, as shown at block 306. The ML model may be built using a ML algorithm, and a set of features produced from selected ones of the properties. The ML model may be built further using a training set produced from the set of features, the flight data including measurements of the selected ones of the properties, and the maintenance data. And the method includes outputting the ML model for deployment to predict and thereby produce a prediction of the life expectancy of the engine of the specific aircraft from distinct flight data for one or more flights of the specific aircraft, as shown at block 308.

Deployment of the ML model may include scheduling off-wing maintenance of the engine of the specific aircraft based on the prediction of the life expectancy of the engine. In some examples, this may also include other events may be triggered by an engine removal, such as QEC kit acquisition, scheduling personnel and equipment needed to perform an engine switch, finding an adequate suitable spare engine, planning for engine induction, and the like. Additionally or alternatively, deployment of the ML model may include determining an adjustment to utilization of the engine of the specific aircraft based on the prediction of the life expectancy of the engine. The method in some examples, then, may further include performing the off-wing maintenance of the engine of the specific aircraft may be performed in accordance with the schedule determined based on the prediction, and/or adjusting utilization of the engine of the specific aircraft according to the adjustment determined based on the prediction.

According to example implementations of the present disclosure, the system 200 and its subsystems including the source 202, AHM system 202a, ML engine 208 (or first and second engines), feature construction or selection module 210, and model building module 212 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
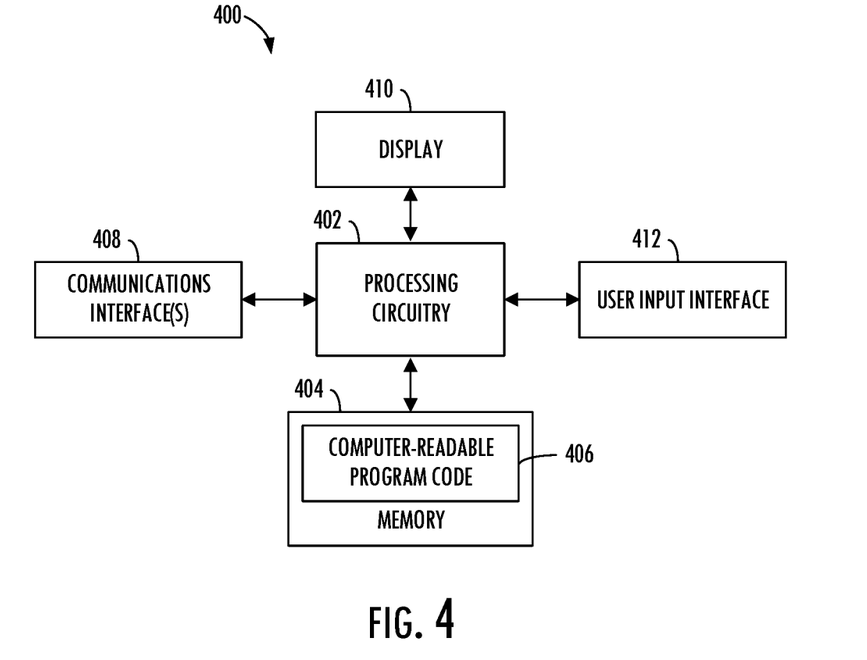
FIG. 4 illustrates an apparatus according to some example implementations.

FIG. 4 illustrates an apparatus 400 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry s which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for supporting off-wing maintenance of an engine of a specific aircraft of a particular type of aircraft, the apparatus comprising:
   a memory storing flight data for flights of a plurality of aircraft of the particular type of aircraft, the flights between airports, the flight data for each flight of each aircraft of the plurality of aircraft including measurements of properties from sensors or avionic systems of the aircraft during the flight, the memory storing airport infrastructure attributes including values of runway characteristics or environmental conditions at the airports, and the memory also storing maintenance data that indicates past maintenance or off-wing maintenance of a corresponding engine of each aircraft of the plurality of aircraft; and
   processing circuitry configured to access the memory including the flight data, the airport infrastructure attributes and the maintenance data, and the processing circuitry configured to execute computer-readable program code to cause the apparatus to at least:
   build a machine learning model to predict a life expectancy of the engine of the specific aircraft, measured to future off-wing maintenance of the engine, the machine learning model built using a machine learning algorithm, the machine learning model built using a set of features produced from selected ones of the properties and selected ones of the airport infrastructure attributes, and the machine learning model built further using a training set produced from the set of features, the flight data including measurements of the selected ones of the properties, values of the selected ones of the airport infrastructure attributes, and the maintenance data; and
   output the machine learning model for deployment to predict and thereby produce a prediction of the life expectancy of the engine of the specific aircraft from distinct flight data for one or more flights of the specific aircraft.

2. The apparatus of claim 1, wherein the flight data includes the measurements of the properties recorded by an aircraft condition monitoring system (ACMS) from the sensors or avionic systems during the flight, and
   wherein the apparatus is caused to access at least some of the flight data for each flight from ACMS reports generated by the ACMS.

3. The apparatus of claim 1, wherein the processing circuitry is configured to execute the computer-readable program code to cause the apparatus to further at least:

determine an adjustment to utilization of the engine of the specific aircraft based on the prediction of the life expectancy of the engine.

4. The apparatus of claim 1, wherein the memory further stores aircraft configuration attributes of the plurality of aircraft of the particular type of aircraft, the aircraft configuration attributes including values of attributes of the corresponding engine of each aircraft of the plurality of aircraft,
 wherein the processing circuitry is configured to access the memory further including the aircraft configuration attributes, and
 wherein the apparatus is caused to build the machine learning model using the set of features produced further from selected ones of the aircraft configuration attributes, and build the machine learning model using the training set produced further from values of the selected ones of the aircraft configuration attributes.

5. The apparatus of claim 1, wherein the processing circuitry is configured to execute the computer-readable program code to cause the apparatus to further at least:
 perform a feature selection or construction using the properties to produce features of the set of features from the selected ones of the properties.

6. The apparatus of claim 5, wherein the feature selection or construction includes the apparatus caused to apply one or more of the selected ones of the properties to a transformation to produce a feature of the set of features.

7. The apparatus of claim 5, wherein the apparatus is caused to perform the feature selection or construction further using the airport infrastructure attributes to produce the features of the set of features.

8. The apparatus of claim 5, wherein the memory further stores aircraft configuration attributes of the plurality of aircraft of the particular type of aircraft, the aircraft configuration attributes including values of attributes of the corresponding engine of each aircraft of the plurality of aircraft, and
 wherein the processing circuitry is configured to access the memory further including the aircraft configuration attributes, and the apparatus is caused to perform the feature selection or construction further using the aircraft configuration attributes to produce the features of the set of features.

9. The apparatus of claim 1, wherein the processing circuitry is configured to execute the computer-readable program code to cause the apparatus to further at least:
 schedule off-wing maintenance of the engine of the specific aircraft based on the prediction of the life expectancy of the engine.

10. A method of supporting off-wing maintenance of an engine of a specific aircraft of a particular type of aircraft, the method comprising:
 accessing flight data for flights of a plurality of aircraft of the particular type of aircraft, the flights between airports, the flight data for each flight of each aircraft of the plurality of aircraft including measurements of properties from sensors or avionic systems of the aircraft during the flight;
 accessing infrastructure attributes including values of runway characteristics or environmental conditions at the airports;
 accessing maintenance data that indicates past maintenance or off-wing maintenance of a corresponding engine of each aircraft of the plurality of aircraft;
 building a machine learning model to predict a life expectancy of the engine of the specific aircraft, measured to future off-wing maintenance of the engine, the machine learning model built using a machine learning algorithm, the machine learning model built using a set of features produced from selected ones of the properties and selected ones of the airport infrastructure attributes, and the machine learning model built further using a training set produced from the set of features, the flight data including measurements of the selected ones of the properties, values of the selected ones of the airport infrastructure attributes, and the maintenance data; and
 outputting the machine learning model for deployment to predict and thereby produce a prediction of the life expectancy of the engine of the specific aircraft from distinct flight data for one or more flights of the specific aircraft.

11. The method of claim 10 further comprising:
 determining an adjustment to utilization of the engine of the specific aircraft based on the prediction of the life expectancy of the engine.

12. The method of claim 10, wherein the flight data includes the measurements of the properties recorded by an aircraft condition monitoring system (ACMS) from the sensors or avionic systems during the flight, and
 wherein least some of the flight data for each flight is accessed from ACMS reports generated by the ACMS.

13. The method of claim 10 further comprising:
 scheduling off-wing maintenance of the engine of the specific aircraft based on the prediction of the life expectancy of the engine.

14. The method of claim 10 further comprising:
 accessing aircraft configuration attributes of the plurality of aircraft of the particular type of aircraft, the aircraft configuration attributes including values of attributes of the corresponding engine of each aircraft of the plurality of aircraft, and
 wherein the machine learning model is built using the set of features produced further from selected ones of the aircraft configuration attributes, and the machine learning model is built using the training set produced further from values of the selected ones of the aircraft configuration attributes.

15. The method of claim 10 further comprising:
 performing a feature selection or construction using the properties to produce features of the set of features from the selected ones of the properties.

16. The method of claim 15, wherein performing the feature selection or construction includes applying one or more of the selected ones of the properties to a transformation to produce a feature of the set of features.

17. The method of claim 15, wherein the feature selection or construction is performed further using the airport infrastructure attributes to produce the features of the set of features.

18. The method of claim 15 further comprising:
 accessing aircraft configuration attributes of the plurality of aircraft of the particular type of aircraft, the aircraft configuration attributes including attributes of the corresponding engine of each aircraft of the plurality of aircraft, and
 wherein the feature selection or construction is performed further using the aircraft configuration attributes to produce the features of the set of features.

19. A computer-readable storage medium for supporting off-wing maintenance of an engine of a specific aircraft of a particular type of aircraft, the computer-readable storage medium being non-transitory and having computer-readable program code stored therein that, in response to execution by processing circuitry, causes an apparatus to at least:

access flight data for flights of a plurality of aircraft of the particular type of aircraft, the flights between airports, the flight data for each flight of each aircraft of the plurality of aircraft including measurements of properties from sensors or avionic systems of the aircraft during the flight;

access airport infrastructure attributes including values of runway characteristics or environmental conditions at the airports;

access maintenance data that indicates past maintenance or off-wing maintenance of a corresponding engine of each aircraft of the plurality of aircraft;

build a machine learning model to predict a life expectancy of the engine of the specific aircraft, measured to future off-wing maintenance of the engine, the machine learning model built using a machine learning algorithm, the machine learning model built using a set of features produced from selected ones of the properties and selected ones of the airport infrastructure attributes, and the machine learning model built further using a training set produced from the set of features, the flight data including measurements of the selected ones of the properties, values of the selected ones of the airport infrastructure attributes, and the maintenance data; and     output the machine learning model for deployment to predict and thereby produce a prediction of the life expectancy of the engine of the specific aircraft from distinct flight data for one or more flights of the specific aircraft.

20. The computer-readable storage medium of claim 19, wherein the computer-readable storage medium has further computer-readable program code stored therein that, in response to execution by the processing circuitry, causes the apparatus to further at least:

schedule off-wing maintenance of the engine of the specific aircraft based on the prediction of the life expectancy of the engine.

21. The computer-readable storage medium of claim 19, wherein the computer-readable storage medium has further computer-readable program code stored therein that, in response to execution by the processing circuitry, causes the apparatus to further at least:

determine an adjustment to utilization of the engine of the specific aircraft based on the prediction of the life expectancy of the engine.

22. The computer-readable storage medium of claim 19, wherein the flight data includes the measurements of the properties recorded by an aircraft condition monitoring system (ACMS) from the sensors or avionic systems during the flight, and wherein least some of the flight data for each flight is accessed from ACMS reports generated by the ACMS.

23. The computer-readable storage medium of claim 19, wherein the computer-readable storage medium has further computer-readable program code stored therein that, in response to execution by the processing circuitry, causes the apparatus to further at least:

access aircraft configuration attributes of the plurality of aircraft of the particular type of aircraft, the aircraft configuration attributes including values of attributes of the corresponding engine of each aircraft of the plurality of aircraft, and     wherein the machine learning model is built using the set of features produced further from selected ones of the aircraft configuration attributes, and the machine learning model is built the training set produced further from values of the selected ones of the aircraft configuration attributes.

24. The computer-readable storage medium of claim 19, wherein the computer-readable storage medium has further computer-readable program code stored therein that, in response to execution by the processing circuitry, causes the apparatus to further at least:

perform a feature selection or construction using the properties to produce features of the set of features from the selected ones of the properties.

25. The computer-readable storage medium of claim 24, wherein the computer-readable storage medium has further computer-readable program code stored therein that, in response to execution by the processing circuitry, causes the apparatus to further at least:

access aircraft configuration attributes of the plurality of aircraft of the particular type of aircraft, the aircraft configuration attributes including attributes of the corresponding engine of each aircraft of the plurality of aircraft, and     wherein the feature selection or construction is performed further using the aircraft configuration attributes to produce the features of the set of features.

26. The computer-readable storage medium of claim 24, wherein the feature selection or construction includes the apparatus caused to apply one or more of the selected ones of the properties to a transformation to produce a feature of the set of features.

27. The computer-readable storage medium of claim 24, wherein the feature selection or construction is performed further using the airport infrastructure attributes to produce the features of the set of features.

\* \* \* \* \*